INVENTOR.
ARMAND L. LABBE
BY
Kane, Dalsimer, Kane & Smith
ATTORNEYS

April 2, 1968      A. L. LABBE      3,375,641

FILTER BAG CLEANING DEVICE

Filed Feb. 28, 1966      5 Sheets-Sheet 3

INVENTOR.
ARMAND L. LABBE
BY
*Kane, Dalsimer, Kane & Smith*
ATTORNEYS

April 2, 1968  A. L. LABBE  3,375,641
FILTER BAG CLEANING DEVICE
Filed Feb. 28, 1966  5 Sheets-Sheet 4

INVENTOR.
ARMAND L. LABBE
BY
Kane, Dalsimer, Kane & Smith
ATTORNEYS

United States Patent Office 3,375,641
Patented Apr. 2, 1968

3,375,641
FILTER BAG CLEANING DEVICE
Armand L. Labbe, Salt Lake City, Utah, assignor to Research-Cottrell, Inc., Bridgewater Township, N.J., a corporation of New Jersey
Filed Feb. 28, 1966, Ser. No. 530,595
6 Claims. (Cl. 55—293)

ABSTRACT OF THE DISCLOSURE

A dust collecting installation in which suspended bag filters are cleaned by a flow of air directed substantially perpendicularly to the bags' longitudinal axes and provides passages to direct the flow of air for cleaning, a fan for developing the air flowing in the passage and intermediate first and second manifolds with duct and damper means whereby air pressure is allowed to build to a predetermined level in one of the manifolds so the air can be transmitted to the remaining manifold and the passages at that predetermined pressure initially upon selected damper actuation.

---

In general, the types of dust collectors to which this invention relates consist of a chamber having a series of tubular elements called "bags" suspended therein. The bags are closed at their upper ends from which they are suspended from supports and open at the lower ends where they are held in fixed position.

Air, gases, or smoke to be filtered are brought into the chamber so that it must enter the bags at the fixed lower open ends thereof. These fluids are induced to flow up into and through the walls of the filter bags along their entire length and are then exhausted from the chamber to the atmosphere or to a gas recovery system. The dust or particles filtered from the fluids is held and collected by the bag walls in between the threads of which the bags are woven. After a length of time the bag walls become so clogged with accumulated dust that the filtering operation must be stopped to enable the bags to be cleaned. Generally there are two or more dust collecting units provided so that one unit can be shut down for cleaning while another is in operation. During the cleaning, dust is loosened from the bags and falls through the lower open ends of the bag to a hopper in the bottom of the chamber from which this dust can be removed.

One of the major difficulties in the filtering of air, gases or smoke is the removal of the dust or solid particles embedded in the filter cloth. The material embedded in the cloth can cause a blinding or clogging of the cloth which reduces the rate of filtering. In some cases there is a total blinding of the cloth.

In United States Patent No. 2,964,129 there is shown apparatus for shaking filter bags to remove the dust or particles collected within the filter cloth by means of directing controlled streams of air or filtered gases on the bag during the cleaning operation. In that patent structure is shown enabling air streams to be introduced into the bag chamber at one or more places with the bags suspended in such a manner so as to allow the air or gas streams so directed to impart to the bags a waving, swinging or flexing motion which is essential to overcome the blinding of the filter cloth.

The invention disclosed herein is an improvement over that shown in the aforesaid patent and the principle object is to minimize the embedded dust and improve the efficiency of dust removal in the cleaning of the bags with reduction in the time required for shaking.

In order to remove the dust collected by a filter cloth, and especially the embedded dust to a comparatively high degree of effectiveness, the cloth has to be subjected to a certain amount of vigorous flipping action and the device disclosed herein is designated to provide the proper air blow to create this flipping action to almost any degree of effectiveness. In order for the blows to be most effective they have to be intermittent which prevents the bag from standing motionless and also prevents the possibility of developing any ineffective rhythmic motions of the bags.

The invention disclosed herein provides an automatic control making it possible to apply shaking of various intensities of proportional volumes of air, pressures and time to give the bags the proper flipping action of a high degree of effectiveness needed to remove the dust embedded in the filter cloth.

An improved dust collecting device constructed in accordance with the teachings of this invention and the method of using the same is disclosed herein with references to the drawings, in which.

Figure 1:
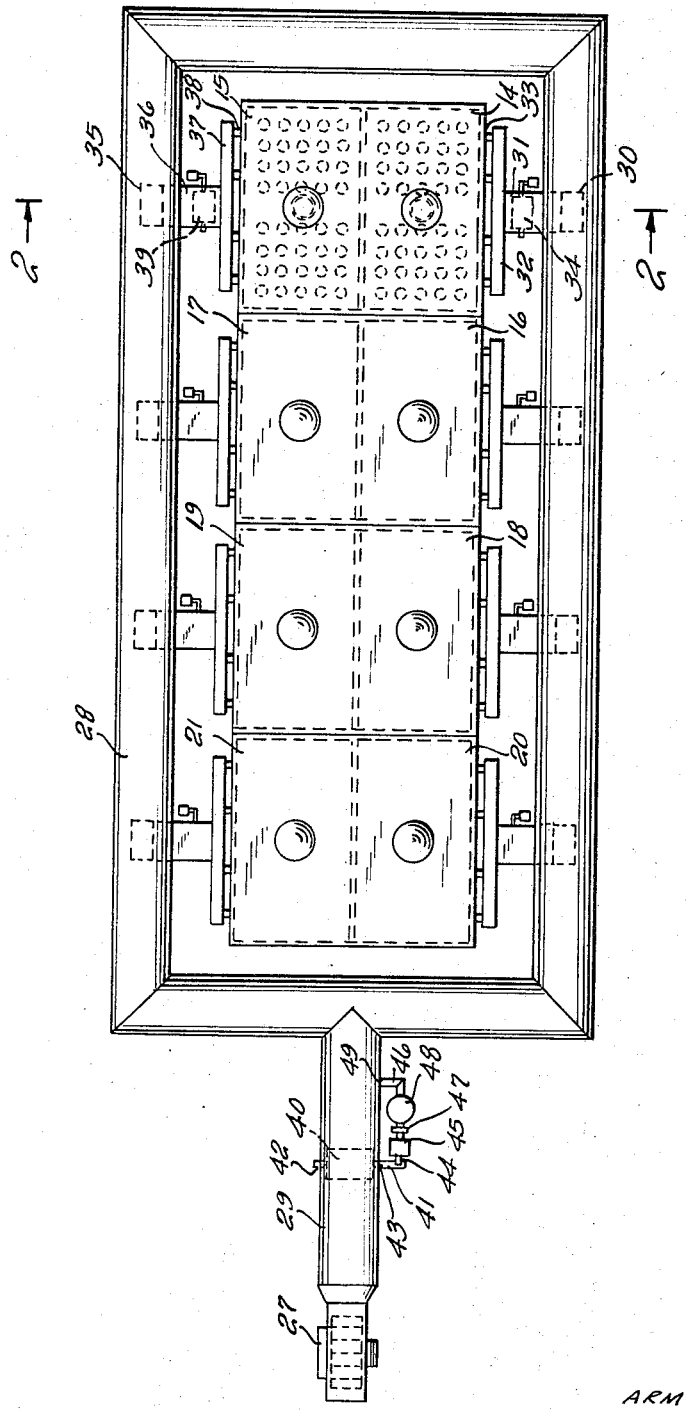
FIG. 1 is a horizontal sectional view of an improved dust collecting device constructed in accordance with the invention and with portions cut away to disclose certain of the details involved.
Figure 2:
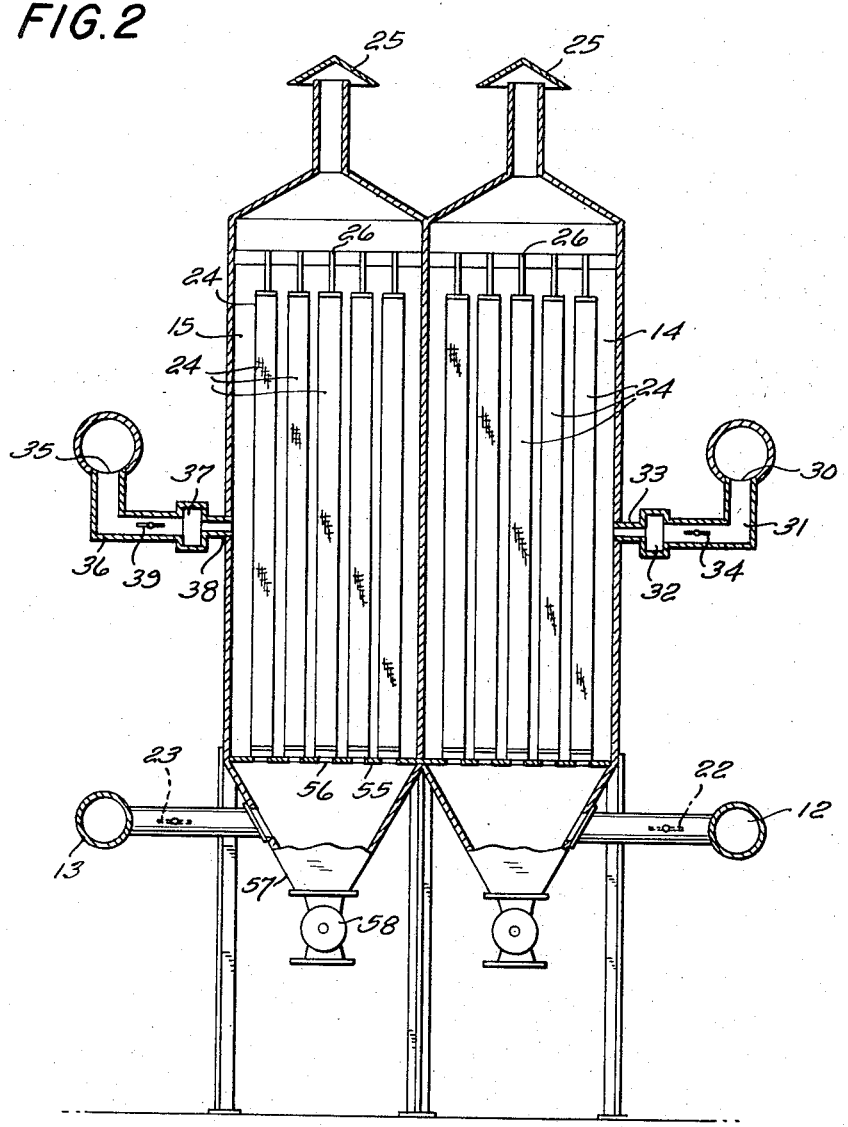
FIG. 2 is a sectional view taken along the line 2—2 in the direction of the arrows in FIG. 1.
Figure 3:
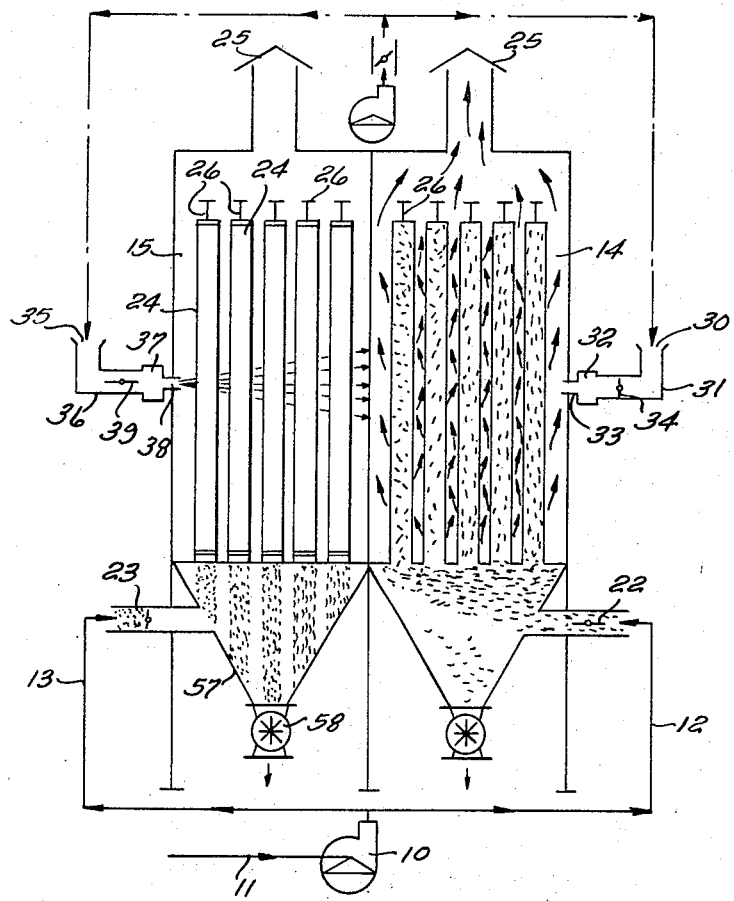
FIG. 3 is a flow diagram of the device shown in FIGS. 1 and 2.

Referring first to FIGS. 1, 2 and 3 and primarily to FIGS. 2 and 3, there is shown a dust collecting device or bag house operated under pressure. In this type of collection device the gas or air to be filtered is delivered to the unit under pressure by the main exhaust fan 10. The pressure side of the main exhaust fan 10 is duct 11, which has branch ducts 12 and 13 leading to bag compartments 14 and 15, respectively, of which generally more than two are provided. In the unit shown herein eight compartments numbered 14 through 21 respectively are shown, as seen in FIG. 1.

The dirt-laden gas or air is blown into the bag compartments through the respective branch ducts. In the figures the supply ducts for bag compartments 16 through 21 are not shown. The gas enters through dampers such as 22 and 23, passes through the bags 24 and the clean filtered gas escapes to the atmosphere under the roof of the bag house which is indicated in the figures by the numeral 25. The supply opening can be opened or closed by activation of the dampers 22 and 23 which is illustrated in the figures. The dampers can be any type device and in actual practice air cylinders which are not shown are utilized which are controlled by electric solenoids. The bags are supported within their respective chambers by hanging to the upper framework as indicated by the numeral 26.

In addition to the structure thus far described there is also provided, as seen best in FIG. 1, an air shake fan 27, a main air supply manifold 28 and duct 29 between the air shake fan and the main air supply manifold. Each bag compartment is operatively connected with the main air supply manifold. Hence, bag compartment 14 is connected with main air supply manifold through opening 30 in manifold 28, duct 31 and air shake nozzle manifold 32. In addition, air shake nozzles 33 of which several are provided interconnecting the air shake nozzle manifold 32 and the bag compartment 14, and damper 34. Bag compartment 15 is likewise connected to manifold 28 through opening 35, duct 36, manifold 37 and nozzles 38. Damper opening 39 is provided in duct 36. Like means is provided with respect to each of the remaining bag compartments as seen in FIG. 1.

Figure 5:
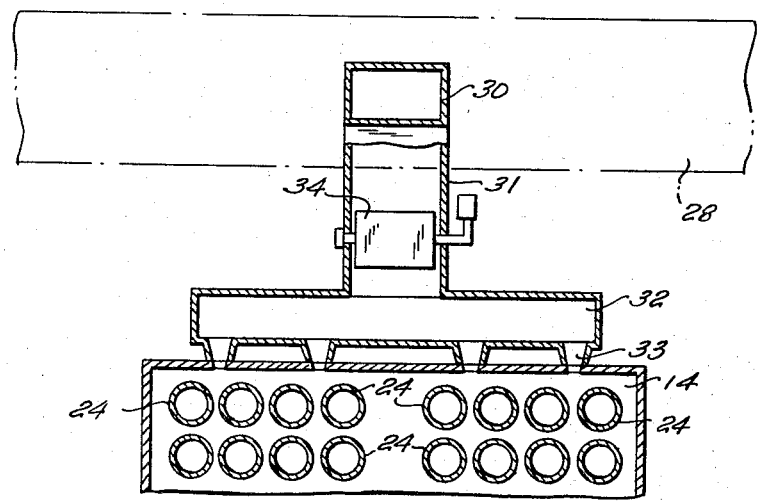
FIG. 5 is a segmentary view of a bag compartment and the duct, with damper enclosed, connection between the main air supply manifold and one of the air shake nozzle manifolds.

In FIG. 5 compartment 14 is shown together with an enlarged view of manifold 32, nozzles 33, duct 31, opening 30 and damper 34.

The individual bag compartments are separated from one another by partitions which are not numbered in the figures although these are clearly shown.

Normally open air blast damper 40 is disposed within duct 29. The damper shaft 41 projects outwardly from the duct at zones 42 and 43 which are sealed and the shaft 41 engages one end of quadrant arm 44 which actuates damper 40 under the control of damper control 45. The damper control 45 is connected to duct 46 through surge tank or buffer 47 and regulator damper 48. The duct 46 is operatively connected with duct 29 through opening 49 therein. This assembly is shown in greater detail in FIG. 4. It is noted in FIG. 4 that regulator damper control 50 is provided to regulate damper 48 and weights 51 and 52 are attached on counterbalance arm 53 which is connected at one end to the shaft 41 of the air blast damper. Weight 51 is provided to locate the damper 40 in a partially open normal condition and weight 52 is provided to balance the weight of the quadrant arm 44 which projects partially within damper control 45. Free floating disk 54 is attached to the end of the quadrant within damper control 45 adjacent the closed end 45a of the damper control. The remaining end is indicated by the numeral 45b and it is an open end. The letter x together with its associated arrows indicates the maximum available disk travel.

Figure 4:
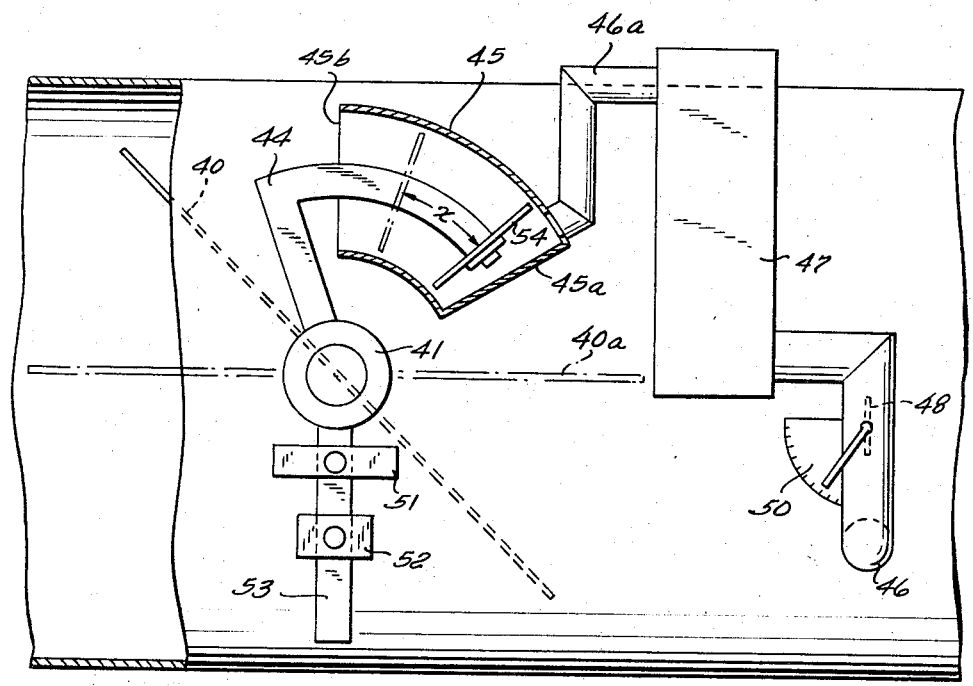
FIG. 4 is a partially sectional view of an automatic valve used in the device in position in the duct leading to the main air supply manifold.

Damper control 45 is connected at its open end to buffer tank 47 by a duct indicated in FIG. 4 by the numeral 46a. Hence the damper control 45 is operatively connected with the duct 29.

Damper 40 is adjusted so that in the absence of a build-up of pressure between the closed end 45a of the control 45 and disk 54 it is partially closed as shown in FIG. 4. A build-up of pressure however between end 45a and disk 54 will move the quadrant counterclockwise as seen in FIG. 4, the distance of travel of the disk 54 being indicated by the letter x, to a substantially completely open position of the damper such as that indicated by the numeral 40a and shown in phantom in FIG. 4.

The operation of the device will now be described.

During filtering the air shake dampers such as 34 and 39, as illustrated in FIG. 1, are closed and fan 27 is operating causing a build-up in pressure at opening 49 and, hence, between disk 54 and the closed end 45a of the damper control 45. This, as explained above, results in counterclockwise rotation of quadrant 44 and maximum opening at damper 40.

When it is necessary to clean the bags in a compartment such as compartment 14, for example, (as seen in FIG. 5) damper 22 is first closed. The nozzles 33 provide for the delivery under pressure of air from manifold 32 upon the opening of damper 34 under solenoid control. The nozzles 33 are arranged so that the air streams which can enter will blow between the bags 24 so that air can impinge on the bags.

Since damper 40 is open to its maximum at this instant maximum air pressure is applied at nozzles 33. However, with the opening of damper 34 the pressure is reduced at duct 46 allowing quadrant 44 and damper 40 to return to the normally partially closed condition as shown in FIG. 4.

The blow resulting from the maximum opening of the air blast shaker damper 40 is of comparatively short duration—in practice only a matter of two to three seconds—however this can be varied. There are two noteworthy factors favorable to the application of this invention. One is that upon closing of damper 34, which is the air shake damper, the pressure in manifold 28 rises to its maximum within a second of time and the air inside of the manifold 28 is compressed to the maximum pressure ready for sudden release on reopening of damper 34. It should also be noted that the bags return to their natural hanging position within an instant ready again to be subjected to another full blast and for that reason successive blows can be applied at a very frequent rate of time.

Figure 7:
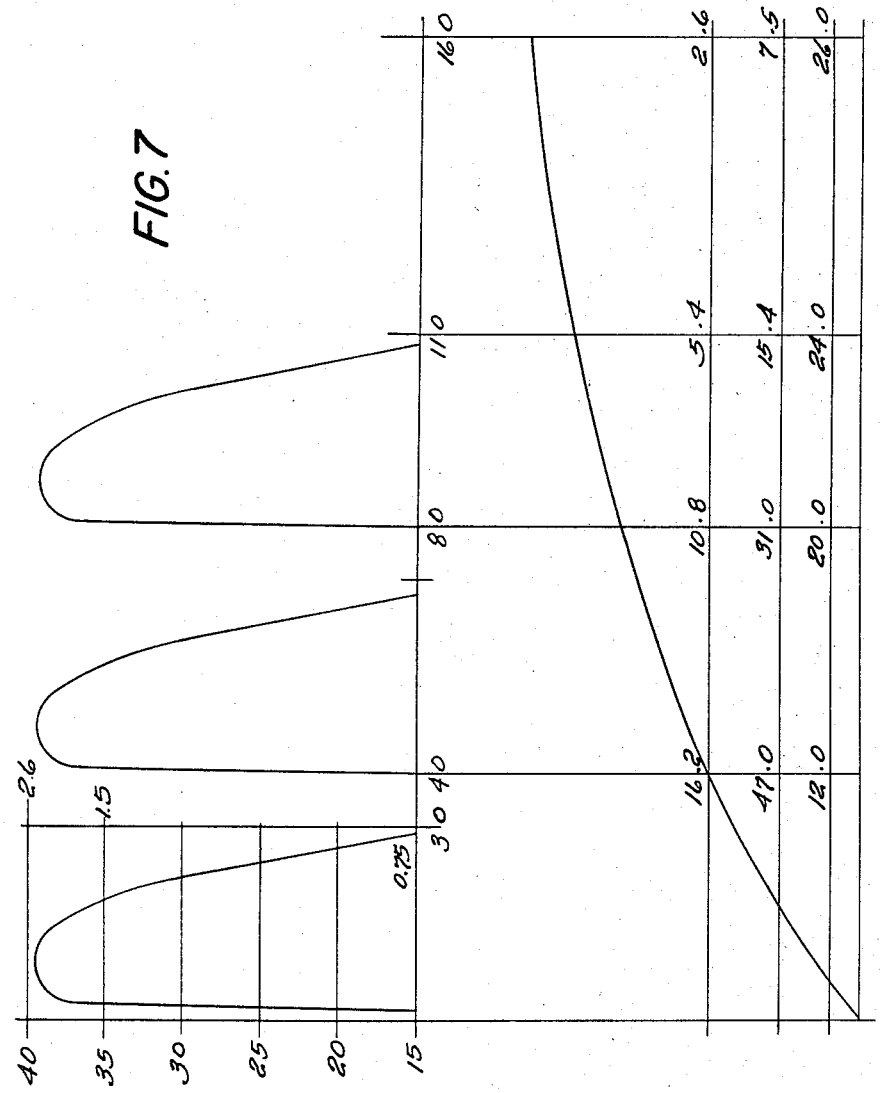
FIG. 7 is a graphic representation of the effectiveness of combining the improvement disclosed herein with the device disclosed in the aforesaid patent.

The operation of the control shown in FIG. 4 in detail is quite simple. For example, if it is desired to apply 2,600 cu. ft. per minute of air blast at 20 inches of water pressure initially, as illustrated in FIG. 7, to provide a momentary rating of 2,600 cu. ft. per minute at 20 inches water that will increase to 40 inches on closing of damper 34 for the initial period of shaking and only 2,000 cu. ft. per minute at 15 inches water for the period of regular shaking, the control is adjusted in the following manner. The damper is partially closed to reduce the volume to 2,000 cu. ft. per minute at 15 inches pressure water for the period of the regular air shake and is wide open for the period of the maximum air blast shake. The adjustable counter-weight 51 is set to limit the flow of air and pressure to activate the free-floating disk 54 when the pressure in manifold 28 is only above 20 inches water. The settings of this control do not require any precise adjusting and the control has been especially designed for the dual application of what is considered to be regular air shake, or shake at the time the damper 40 is in its partially open condition and to provide for the initial maximum pressure.

The curves shown in FIG. 7 indicate the most efficient procedure of applying the two forms of shake. The reason for having the maximum preceding the regular is shown by the data of the lower curve which indicates an increase in efficiency with time. The reason for the apparently high percentage of dust shaken out of the bags by the first blow is that the major portion of this dust is the dust collected on the very surface of the cloth. There is substantially progressive increase in effectiveness of shaking with every shake due to the decrease in the weight of dust in the bags and especially for the first blow.

Figure 6:
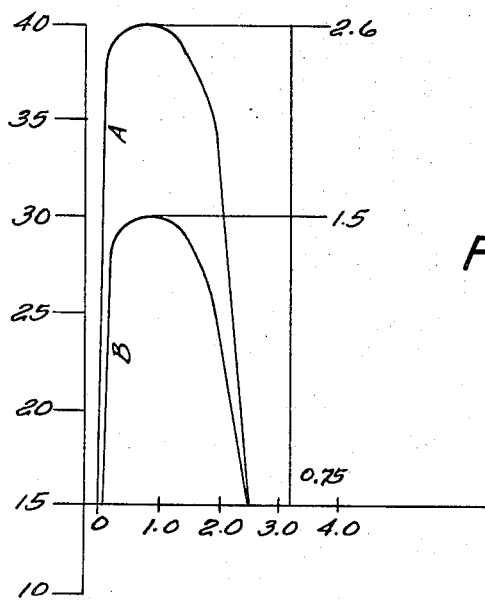
FIG. 6 is a graphic representation of two comparative examples of the invention utilized at different pressures and volumes.

The curves shown in FIG. 6 are two comparative examples of the graphic performance of the utilization of this invention at different pressures and volumes. As may be noted, curve A has ten inches water more pressure than curve B and has also thirty percent more volume as indicated by the greater width in the upper portion of the curve. This also has approximately seventy-three percent greater shaking force.

It is noted in the figures that a substantially horizontal partition 55 having openings 56 therein is provided to insure passage of the dust-laden air into the bags 24 in the bag chambers, since the open bottom of each of the bags is secured around a respective opening 56 in horizontal partition 55.

It is noted that the air shake nozzles such as nozzles 33 in FIG. 1 are shown to be located between each two rows of filter bags and also nearly midway along the length of the bags. It should be noted that the positioning of the nozzle can be varied to suit the particular application and in some instances this air opening could be a continuous slot across the face of the bags rather than the use of nozzles.

In FIG. 3 the bag chamber 14 is illustrated as containing bags receiving dust-laden air while the bag chamber 15 is illustrated as containing bags undergoing cleaning by means of air shake through valves 39. Dust shaken from the bags falls into a hopper in the lower portion of the bag chamber, such as hopper 57 in FIG. 3, and is ultimately removed from the hopper by means of hopper valve 58. Any suitable valve can be used for this purpose depending upon the application.

In addition to the above, means are provided for fanning the fluid moving through nozzle 38, and the other nozzles when the respective bags are undergoing cleaning, in order to fan the fluid into a rapidly oscillating stream transversely of the bag axis to effect a flexing of the bags and impart a shaking action thereto. Suitable means for this purpose could be means for successive opening and closing the respective damper such as damper 39. During the period of air shaking the oscillation is inflicted so as to create a back-and-forth movement as often as two or three times a second or less. The amount of movement depends upon the pressure of the air stream and the material makeup of the bags as well as the type of dust collected.

Thus, among others, the several objects of the invention, as specifically aforenoted, are achieved. Obviously, numerous changes in construction and rearrangement of the parts may be resorted to without departing from the spirit of the invention as defined by the claims.

I claim:

1. In a dust collecting housing, a bag chamber, a plurality of filter bags suspended within said chamber in parallel disposed relation with their longitudinal axes substantially vertical, means for passing a gas to be filtered into and through the bags, said bag chamber having a plurality of passages formed in the side thereof in a zone intermediate the tops and bottoms of said filter bags, a first manifold, a plurality of first ducts extending from said first manifold to said passages, a second manifold, a second duct connecting said first and second manifolds, air supply means for providing a source of air, a third duct connecting said air supply means and said second manifold, first damper means in said third duct, second damper means in said second duct, first and second damper actuating means for opening and closing said first and second damper means respectively and pressure sensitive means operatively associated with said first damper actuating means and communicating with said second manifold operative to regulate the degree of opening and closing of said first damper means in response to changes in air pressure in said second manifold upon the opening and closing of said second damper means by said second damper actuating means whereby the pressure of air in said passages is regulated.

2. A dust collecting device in accordance with claim 1 in which said first damper means is a rotatably mounted plate and said first actuating means is a quadrant having one arm thereof attached to said first damper means for rotating the same and said pressure-sensitive means comprises an enclosure into which the remaining arm of said quadrant projects and a means on said quadrant arm, and means are provided for varying the pressure within said enclosure in direct proportion to the variance of pressure in said second manifold whereby said quadrant arm is moved rotating said first damper means in response thereto.

3. A dust collecting device in accordance with claim 1 in which said first damper means is normally partially open to permit flow of air therethrough.

4. A dust collecting device in accordance with claim 2 in which the end of said quadrant is provided with a disk which movingly and sealingly engages the inside surface of said enclosure and an operative connection is made between said second manifold and said enclosure for introducing variations in pressure in said second manifold between said disk and a closed end of said enclosure.

5. A dust collecting device in accordance with claim 3 in which said first damper means is a rotatably mounted plate mounted on a rotatable shaft and a counterbalance is provided on the shaft for adjusting the amount by which the first damper is normally partially open.

6. A dust collecting device in accordance with claim 3 including a second bag chamber, a second plurality of filter bags suspended within said second bag chamber in parallel disposed relation with their longitudinal axes substantially vertical, said second bag chamber having a second plurality of passages formed in the sides thereof in a zone intermediate the tops and bottoms of said plurality of filter bags, a third manifold, a plurality of fourth ducts leading from said third manifold to said second plurality of passages, a fifth duct connecting said third and second manifolds, fifth damper means in said fifth duct, fifth damper actuating means for opening and closing said fifth damper means, and said pressure sensitive means being responsive to changes in air pressure in said second manifold upon the opening or closing of said fifth damper means by said fifth damper actuating means.

References Cited

UNITED STATES PATENTS

| | | | |
|---|---|---|---|
| 2,576,656 | 11/1961 | Wallin | 55—213 |
| 393,748 | 12/1888 | Dixon | 137—494 |
| 1,622,448 | 3/1927 | Kalkbrenner | 137—494 |
| 2,368,787 | 2/1945 | Skinner | 55—283 |
| 2,836,256 | 5/1958 | Caskey | 55—293 |
| 2,964,129 | 12/1960 | Labbe | 55—272 |
| 3,178,868 | 4/1965 | Gibby | 55—96 |

FOREIGN PATENTS

| | | |
|---|---|---|
| 114,262 | 12/1941 | Australia. |
| 1,242,091 | 8/1960 | France. |

OTHER REFERENCES

Albany Felt Co.: Air Filter, On Chemical Engineering, vol. 72, issue 14, page 84, July 5, 1965 (a copy in the scientific library).

HARRY B. THORNTON, *Primary Examiner.*

B. NOZICK, *Assistant Examiner.*